INVENTOR.
WILLIAM HOTINE,
By Edward B. Johnson
AGENT.

METHOD OF VAPOR PLATING

Original Filed May 10, 1966 3 Sheets-Sheet 2

INVENTOR.
WILLIAM HOTINE,
By Edward B. Johnson
AGENT.

METHOD OF VAPOR PLATING

Original Filed May 10, 1966

INVENTOR
WILLIAM HOTINE,
By Edward B. Johnson
AGENT.

3,537,847
Patented Nov. 3, 1970

3,537,847

METHOD OF VAPOR PLATING

William Hotine, Albion, Calif., assignor to General Dynamics Corporation, a corporation of Delaware Original application May 10, 1966, Ser. No. 548,888. Divided and this application Oct. 22, 1968, Ser. No. 777,540
Int. Cl. G03g *13/00, 13/22*
U.S. Cl. 96—1.3 3 Claims

ABSTRACT OF THE DISCLOSURE

A method for vapor plating by means of electrostatically controlled method utilizing an electroless plating solution to deposit a printed circuit on an insulating substrate by the use of a matrix comprising a sheet containing a plurality of apertures coated with a photoconductive layer which transfers electrostatically the desired image to the substrate.

The present application is a division of application Ser. No. 548,888, filed May 10, 1966.

This invention relates to vapor plating, and particularly to an electrostatically controlled method and apparatus for vapor plating utilizing an electroless plating solution to deposit a printed circuit on an insulating substrate without the use of masking processes.

Previous maskless or screenless electrostatic printing devices have utilized a thin layer of homogeneous photoconductive material as a medium for the generation of an electrostatic analogy of a visible pattern. The electrostatic analogy or image is a graduation of the values of electrostatic charges of one polarity on the surface of the photo-conductive layer. A layer of insulating material has been placed in an electrostatic field above this electrostatic image so that minute particles charged to the opposite polarity are accelerated toward and attracted to the image and are deposited on the surface of the insulating material to form a visible reproduction of the original visible pattern. In this prior system, there is no positive means to positively prevent the unwanted deposition of particles in blank white areas of a black pattern.

The present invention is an improved system for electrostatic control of the deposition of either solid or liquid particles of one polarity on the surface of an insulating layer or substrate. The present invention provides an electrostatic image composed of charges of two polarities, one of which attracts the particles to form black areas of a visible pattern, the other polarity repels the particles to prevent their unwanted deposition on blank white areas of a black pattern.

The electrostatic image of the present invention is formed on the surface of an insulating layer or substrate by means of an underlying novel, synthetic photo-conductive matrix which is fabricated in such a manner that it has the necessary desirable properties for the generation of an electrostatic analogy of a visible pattern.

Therefore, it is an object of this invention to provide an improved maskless method and apparatus for electrostatic deposition of a visible pattern on a substrate which employs charges of two polarities on said substrate to enable improved contrast and definition.

A further object of the invention is to provide an improved maskless method and apparatus for electrostatically controlling the deposition of an electroless plating solution on an insulating substrate to form a printed circuit.

Another object of the invention is to utilize a film negative of a visible pattern to control the deposition of either solid or liquid particles on a substrate to form a reproduction of the visible pattern on the film.

Another object of the invention is to provide a method for an automatic continuous process of production of printed circuits without the use of masking or etching processes.

Another object of the invention is to provide a method and apparatus for electroless vapor plating on a layer of plastic.

Another object of the invention is to provide a method and apparatus for depositing different thicknesses of plating on selected areas of an insulating substrate without the use of masking or screening processes.

Another object of the invention is to accomplish the above objects in air at normal barometric pressure, and at normal temperatures.

Other objects of the invention will become readily apparent from the following description and accompanying drawings wherein.

Broadly, the invention relates to an electrostatically controlled method and apparatus for vapor plating, using an electroless plating solution to deposit a printed circuit on an insulating substrate without the use of masking processes. More particularly, the subject apparatus includes a tank of electroless plating solution for providing a cloud of small droplets of said solution, a grid suspended over said tank for imparting a negative charge to said droplets, a substrate on which a printed circuit is to be vapor deposited, a photoconductive glass or aluminum matrix plate for conveying a desired charge to said substrate, a film negative for selectively illuminating said matrix plate, and a source of light.

Figure 1:
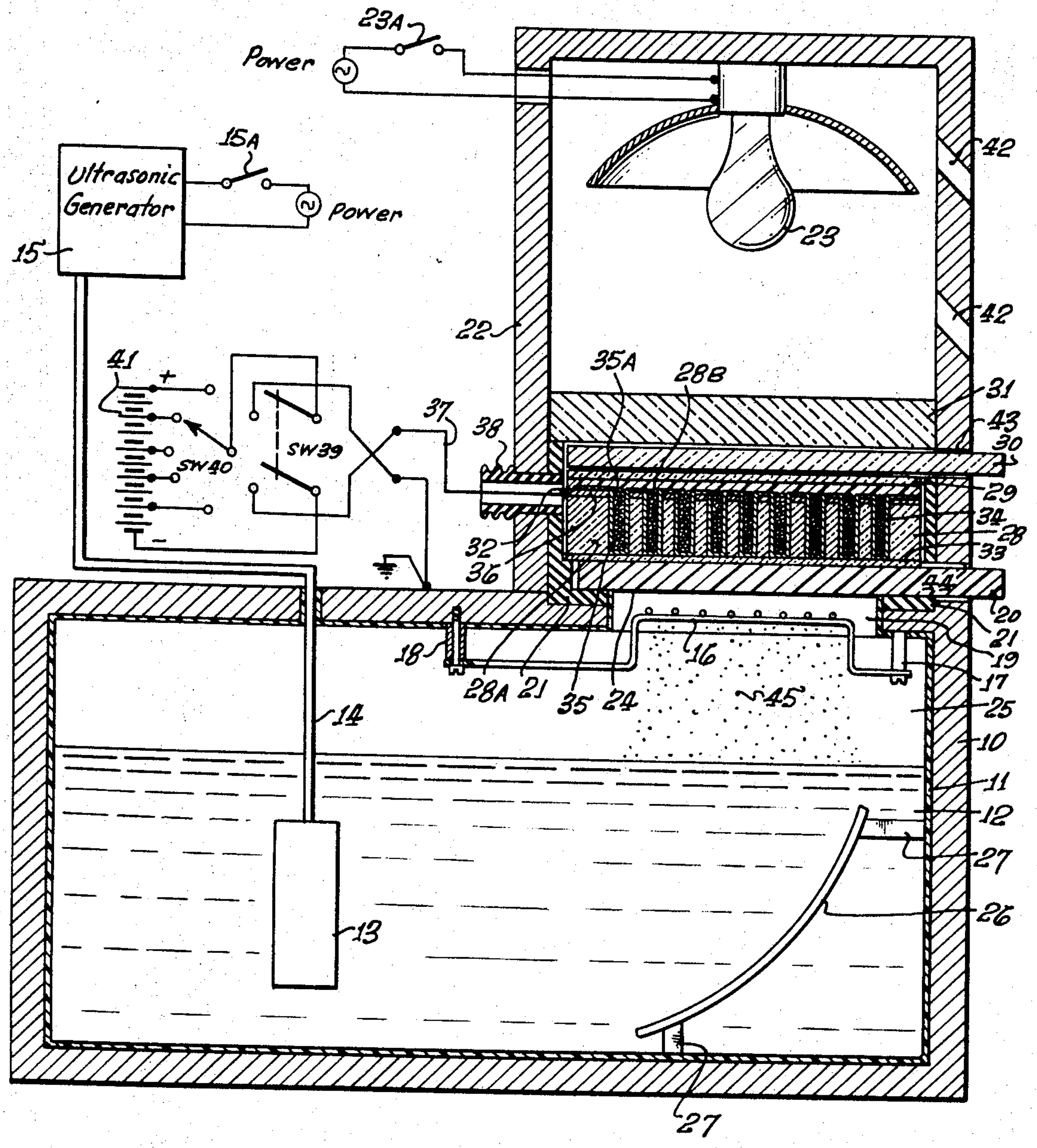
FIG. 1 is a view partially in cross section of a first embodiment of the inventive apparatus for carrying out the method thereof.

With the conductive matrix plate being constructed of glass, for example, as shown in the FIG. 1 embodiment, the glass plate is provided with closely spaced holes over its area with a thin opaque glass layer cemented to the bottom surface thereof for covering the bottoms of said holes. A metallic conductive layer is placed on the upper surface of said glass plate, said holes extending therethrough. The inside surfaces of said holes and the top of the metallic conductive layer are coated with a thin layer of photoconductive material. Transparent particles are used to fill said holes and are there retained by a transparent plastic covering deposited over the thin layer of photoconductive material. A voltage source is connected to the conductive layer for selectively applying positive and negative charges thereto.

By way of operation of the FIG. 1 embodiment, for example, a negative charge is placed on the metallic conductive layer of the matrix. The light source is then energized for a period long enough to allow a negative charge to be conveyed to the substrate. A film negative having the pattern of the desired printed circuit is then placed between the matrix and the light source while the metallic conductive layer is positively charged. The light source is again energized and the pattern of positive charges in the design of the desired printed circuit is caused to be placed on the substrate. Negatively charged vapor droplets are thereby attracted to the positively charged portions of the substrate forming a vapor deposited printed circuit.

Figure 5:
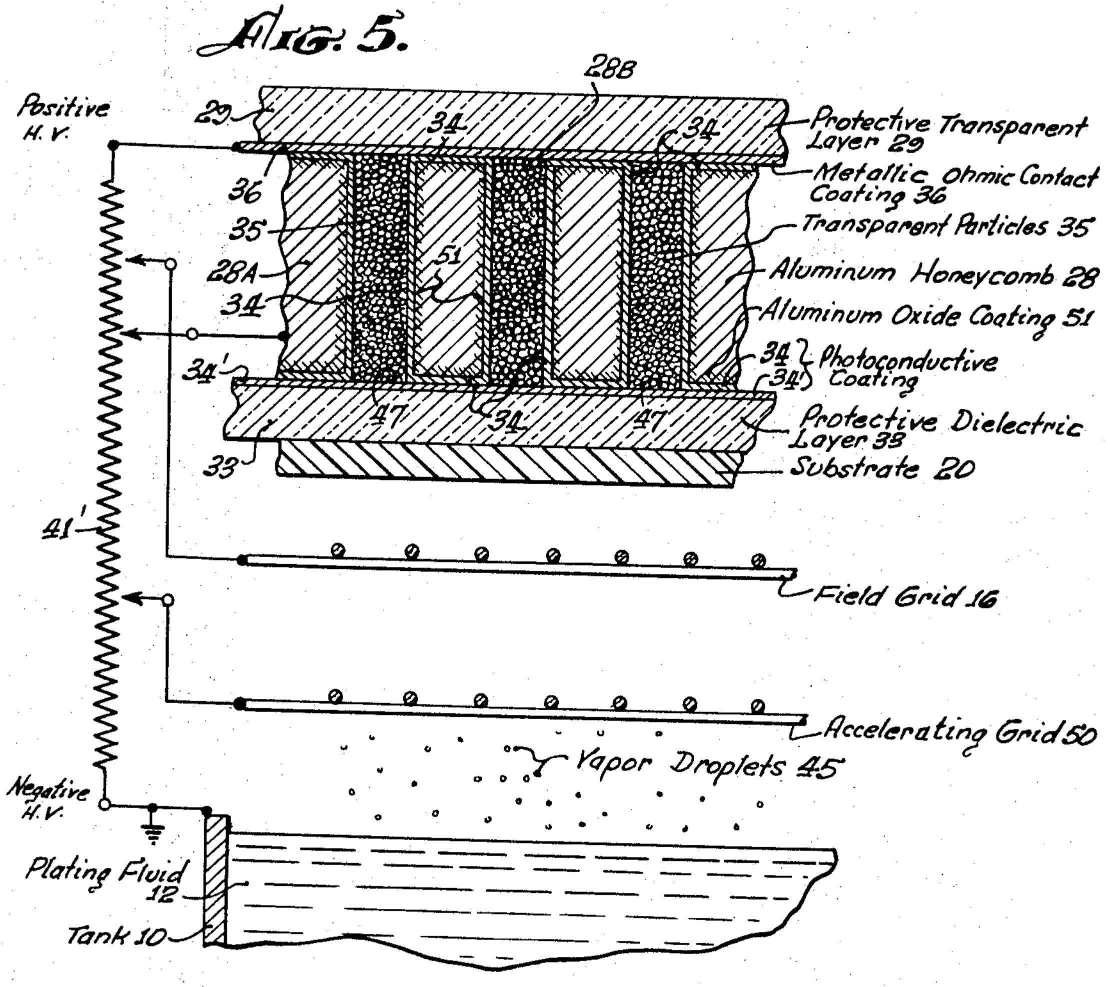
FIG. 5 is a partial view, partly in cross section, of another embodiment of the inventive apparatus.

The FIG. 5 embodiment is generally similar to the above briefly described FIG. 1 embodiment except that the photoconductive matrix plate is constructed of aluminum, and that a different type electrical control arrangement is utilized.

Referring now to FIG. 1, a metal tank 10 which is provided with a non-corrosive lining 11 contains an electroless plating solution 12. An ultrasonic transducer 13 is suspended and submerged in solution 12 by its electric leads 14 connecting to an ultrasonic generator 15, which is supplied power from a source through switch 15A. A wire grid 16 of non-corrosive material is held by conductive supports 17 and 18 and is placed in an opening 19 which is in the upper side of tank 10. Above opening 19 is placed a substrate 20 which is made of an insulating plastic such as Mylar. The edges of substrate 20 rest on an insulating lining 21 of metal enclosure 22 which contains a light assembly 23, supplied with power through switch 23A. The under side 24 of substrate 20 is exposed to the air indicated at 25 in tank 10. A polished curved metal reflector 26 is located on supports 27 at a position below opening 19 in solution 12, and in a position to reflect output energy of transducer 13 to the surface of the solution. Above the substrate 20, within lining 21 of enclosure 22, are located, lying in order, a photo-conductive matrix plate 28, a film negative 30, and a transparent retaining plate 31. As shown in FIG. 1, the last described elements are greatly enlarged for clarity.

The photoconductive matrix plate 28 is a glass plate 28A having closely spaced small through holes 28B over its area with a cemented-on thin opaque bottom layer 33 of opaque glass or other insulating material which closes the bottoms of the holes 28B. The inside surfaces of the holes and areas on the top of a conducting metal layer 36 are coated with a thin layer of a photoconductive material 34 such as cadmium sulphide. The holes 28B are filled with micron sized transparent particles 35 made of glass or plastic, and a transparent plastic coating 35A is used to retain the particles in the holes. The conductive layer 36 of metal is deposited on the top of glass plate 28A before the deposition of the cadmium sulphide, to act as an electrical contact to the areas of photoconductive layer 34 at the top of the holes 28B. An electrical connection 32 is made to layer 36 and brought cut by lead 37 through insulator 38 mounted in enclosure 22. Lead 37 is connected to double pole polarity reversing switch 39, which is wired to voltage selector switch 40 and tapped power supply 41, symbolized by a battery of polarity shown. Tank 10 is grounded permanently for safety and the power supply 41 is ungrounded. Ventilation openings 42 are provided in enclosure 22, which do not admit external light but which admit cooling air for light assembly 23. A slit 43 is also provided in enclosure 22 for insertion and removal of film negative 30. Another slit 44 in enclosure 22 is provided for insertion and removal of substrate 20, the upper side of which is in contact with the lower side of the photo-conductive matrix 28.

Figure 2:
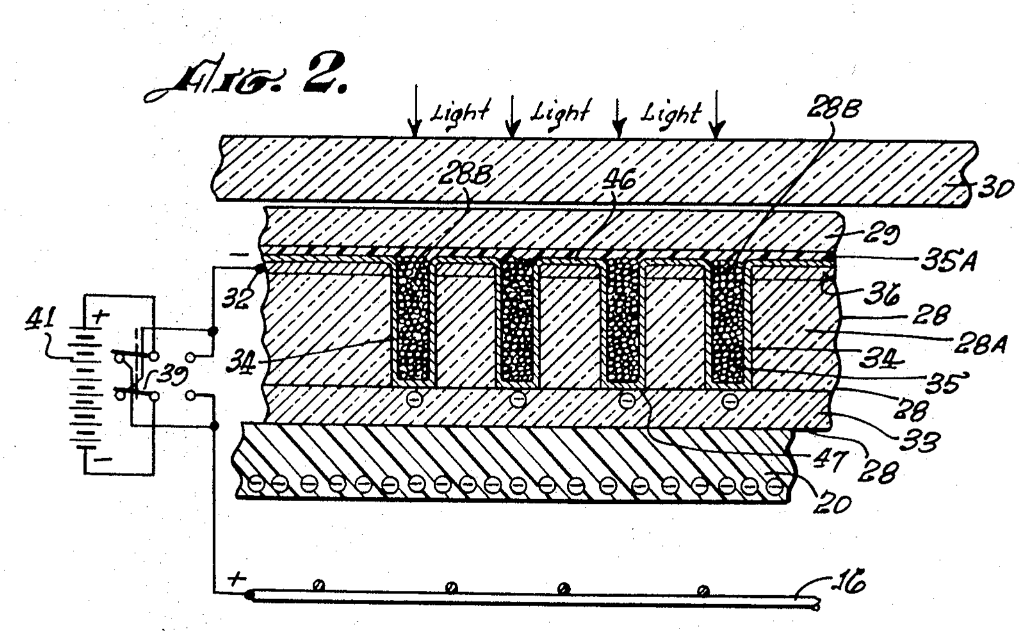
FIGS. 2 and 3 are enlarged views illustrating the operation of the method by the FIG. 1 apparatus.

Referring to FIG. 2, a greatly enlarged sectional view is shown of portions of the illuminated photographic negative 30, the photoconductive matrix 28, the substrate 20, and the grid 16 which are located in or above opening 19 of tank 10. In FIG. 2, operation of the process is started by throwing switch 39 to the left to establish the voltage polarities shown, with the metallic conductive layer 36 connected to the negative, and grid 16 connected to the postive of the power supply 41. A completely transparent film 30 is inserted in slot 43 and switch 23A is closed to light assembly 23 thus illuminating film 30. The light, as indicated by the arrows, shines through film 30, transparent layer 29, transparent layer 35A, and impinges on holes 28B. The light which penetrates holes 28B is scattered by particles 35 as it penetrates the holes, so that the photoconductive coating 34 on the sides of the holes is illuminated. When coating 34 is illuminated its resistance is lowered by a factor of approximately $10^4$ to $10^5$ thus providing a relatively good conductive path of $10^3$ to $10^4$ ohms from the top areas 46 of coating 34 to the bottom 47 of the holes. The top areas 46 are deposited on conductive layer 36 and are thereby electrically connected to layer 36. Electron movement caused by the E.M.F. between grid 16 and the botttom 47 holes 28B will cause the bottom surface of the substrate 20 to acquire negative charges as shown in FIG. 2. The bottom surface of substrate 20 is thus charged negatively over its entire surface area. Light assembly 23 is then extinguished by opening switch 23A, and switch 39 is opened. The above described sequence requires only a few milliseconds to charge substrate 20, with power supply 41 giving suitable voltage.

Figure 3:
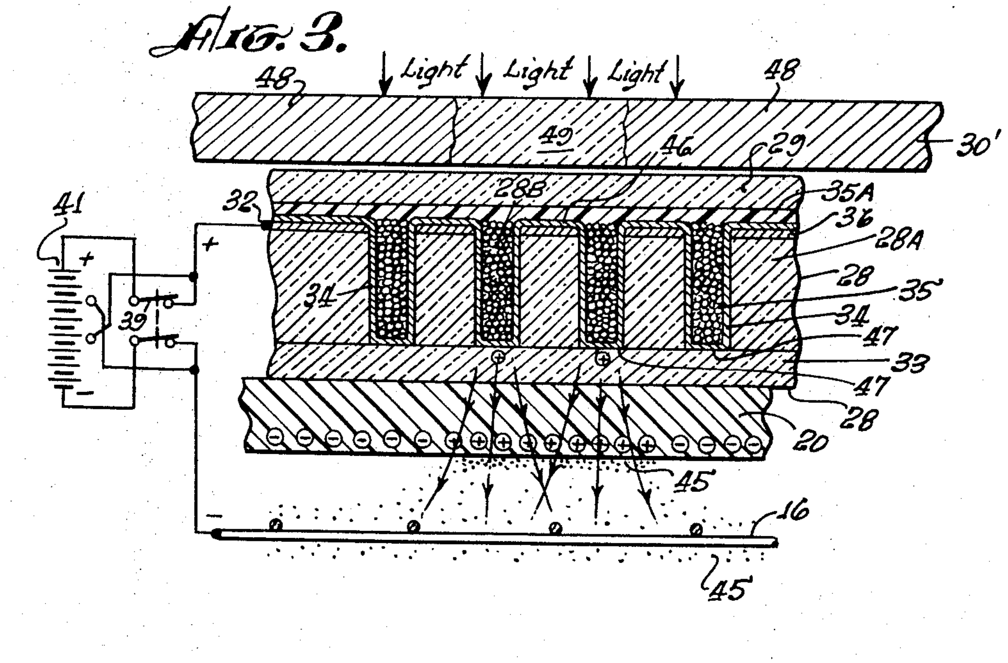

A film negative 30' of the desired printed circuit is substituted for the transparent film 30 as previously set forth above to continue the operation sequence. As can be seen in FIG. 3, the enlarged view shows film negative 30' in position, having a circuit pattern defined by opaque areas 48 and transparent areas 49. Switch 39 is then closed to the right, as shown in FIG. 3, thus reversing the former voltage polarities and making the metallic conductive layer 36 positive and the grid 16 negative. Switch 23A is now closed, lighting assembly 23 and illuminating the top of film negative 30' as shown by arrows. The transparent portions 49 of negative 30' will allow light to strike the tops of holes 28B underneath these areas, the light penetrating the holes and being scattered by particles 35 to illuminate the layer 34 on the sides of the holes. When layer 34 is illuminated, its resistance is lowered by a factor of about $10^4$ to $10^5$ thus providing a relatively good conductive path from the positively polarized layer 36 and the top areas 46 of coating 34 to the bottoms 47 of the holes 28B. Postitive charges at the bottoms 47 of the illuminated holes will migrate through the dielectrics to the under surface of substrate 20, following the approximately vertical electrostatic lines of force which extend to the negative electrode 16, as indicated by the arrows, and these positive charges will first cancel the existing negative charges in the local areas under the illuminated holes, and then will accumulate on the under surface of substrate 20 in these areas as shown in FIG. 3. Where light cannot penetrate the opaque portions 48 of film 30', the layer 34 will remain a very high (dark) resistance, so that comparatively little negative charge will leak off, thus leaving the negative charges on the under surface of substrate 20 under opaque areas 48 of film 30. The electrostatic charges on the under surface of substrate 20 are now a replica of the printed circuit pattern on film negative 30, with positive charges on this surface denoting circuit paths, while negative charges on the surface denote the blank insulating spaces between the circuit paths.

At this point in the process power is applied to the ultrasonic generator 15 of about 50 watts power output, for example, by closing switch 15A. The output of generator 15 is at a frequency of approximately 2 megacycles and is applied to transducer 13, which transforms the electrical energy input to sonic vibration. This vibrational energy is directly transmitted in solution 12 to impinge on reflector 26, which changes the direction of the ultrasonic energy to a direction toward the surface of solution 12. Due to the curvature of reflector 26 random direction interferences of the sonic energy take place at the solution surface which act to break up the surface and produce very small droplets 45 of approximately one micron diameter which are impelled upwards into the atmosphere. The droplets 45 are denoted by the dots in FIGS. 1 and 3. The cloud of droplets rises, forming a vapor which passes through grid 16, the individual droplets 45 acquiring negative charges from grid 16. The electrostatic field gradient between grid 16 and the positive charges on the under surface of substrate 20 accelerates these negatively charged droplets 45 toward these positively charged areas, where the droplets are deposited and are merged together by their surface tension. Negatively charged areas will repel the droplets so they are not deposited on these areas as shown on FIG. 3. Switch 40 is adjusted for optimum voltage for vapor plating at this point in the process. The plating can then be continued for the time required to deposit the desired thickness of metal on substrate 20. When this desired thickness is attained, all switches are opened and substrate 20 is removed via slit 44, rinsed and dried.

The chemical preparation of the surface of substrate 20 includes the following steps for a silver electrostatic electroless vapor plating of a printed circuit on a plastic substrate. In the following procedure, a rinsing stage in clean water occurs between each of the steps.

(1) Roughen under surface of substrate for mechanical bonding of the deposited metal to this surface.

(2) Clean in alkaline solution or detergent.

(3) Oxidize slightly in chromic acid solution for surface wettability.

(4) Treat surface to be deposited on with stannous chloride solution, which acts as a catalyst to cause metal precipitation from an electroless plating solution.

(5) Dry.

At this point in the preparation process the substrate 20 is ready to use in the plating process described above. Solution 12 in the plating process, for example, may be a standard well known silver electroless plating solution. Other metals may be deposited by using other suitable electroless solutions.

The method of generating the vapor droplets 45 which was described above is known in the prior art, but has not been previously applied in an electroless plating process. Other alternate well known methods of forming vapor droplets, or a mist, such as an atomizer gun, may be used, with suitable modifications of the tank 10 of FIG. 1.

The mechanical arrangement of the apparatus of FIG. 1 is novel, in that only by such an assembly can the provision be made for exposure of only one side of the substrate to the plating vapor, while the substrate itself is utilized to protect the photo-conductive matrix from undesired deposit of metal.

The method of operation described above is novel, in that it enables the charging of the under surface of substrate 20 with an electrostatic analogy of the circuit pattern on film negative 30′, and which enables maintaining this charge pattern while the deposition of charged vapor droplets 45 is taking place on desired oppositely charged areas while the droplets are repelled and excluded from undesired areas charged to the same sign (polarity) as the vapor droplets. This method of operations dispenses with mechanical masks or screens formerly used in electrostatic depositions.

The method described also enables the thickening of the plating deposition in selected areas by first depositing these areas only, controlled by one negative, and then depositing the entire pattern over these thickened areas, by use of a second negative registered in position with the first. This method enables great accuracy in dimensions of printed circuits as it eliminates the steps of masking and mask fabrication with their accompanying errors.

Also, the above described method is adaptable to a continuous process of production by suitable modifications. The film can be made a continuous strip, and the substrate a continuous tape, fed through a machine in synchronism while the plating deposition takes place. Various solutions in succeeding tanks may be used to deposit various metals such as resistor materials, and to deposit other materials such as dielectrics for capacitors.

A major element of the invention is the novel photoconductive matrix 28. The use in matrix 28 of the transparent particles 35 to scatter light entering the hole and thus illuminate the photo-conductive layer 34 on the sides of the hole is new. The particles 35 may have an optimum size and can be made of an optimum material for the particular wavelengths of light employed to illuminate the hole. Other methods or materials might be here employed if they accomplish the purpose of scattering the light which enters the hole vertically, to illuminate the sides of the hole, such as fiber optical elements which are finished with smooth end and roughened side surfaces. The holes are formed in glass sheet 28A by chemical machining or etching, and have been produced as small as 800 holes to the linear inch or 640,000 holes per square inch. The resolution of the system, or resultant definition and tolerance of the printed circuit conductor outline and size is a direct function of the hole size and hole spacing.

The process of making the photoconductive matrix, for example, follows the steps given below:

(1) Clean the perforated glass sheet 28A.

(2) Vacuum deposit conductive layer 36, while masking holes 28B. Layer 36 may be of metal indium if the photoconductive layer 34 is cadmium sulphide.

(3) Remove the masking from holes 28B.

(4) Cement plate 33 on the bottom of glass sheet 28A, thus closing the bottoms of holes 28B. Plate 33 is opaque to light.

(5) Vaccum deposit photo-conductive layer 34 over the surface of conductive layer 36 and on the sides and bottoms of holes 28B. Layer 34 may be cadmium sulphide.

(6) Vacuum deposit sensitizer on top of photoconductive layer 34. Sensitizer may be 0.6% copper by weight of the cadmium sulphide layer.

(7) Fill holes 28B with transparent micron size particles of glass or plastic 35.

(8) Deposit transparent layer 35A over the top of layer 34 and particles 35. Layer 35A may be a transparent plastic cement.

(9) Cement protective transparent layer 29 over layer 35A. Layer 29 may be glass.

Figure 4:
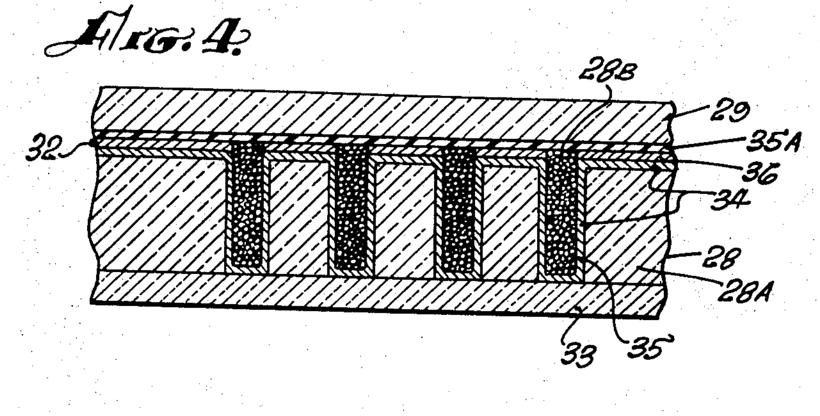
FIG. 4 illustrates an alternate construction of the conductive matrix assembly.

FIG. 4 illustrates an alternate construction of the photoconductive matrix 28 wherein layer 36 is deposited on top of layer 34 after holes 28B are filled with masking particles, removing these masking particles after the deposition of layer 36 and then filling the holes with operative transparent particles 35. This construction makes an ohmic connection from layer 36 to the top surface of layer 34 instead of to the bottom surface thereof as shown in FIGS. 1–3.

The operating voltages have not been given for the operation of the FIG. 1 electrostatic plating apparatus as these are subject to variation according to dimensions and thicknesses of apparatus components.

FIG. 5 illustrates a modified embodiment of the FIG. 1 apparatus having a matrix plate of aluminum, perforated with holes like a honeycomb, anodized to produce a coating of aluminum oxide over the entire surface of the plate including the interior of the holes. This construction enables the use of the aluminum plate as an element of the electrostatic control circuit, which enables a more simplified operation of the electrostatic control of the vapor droplet deposition than previously described. Briefly, the potential of the aluminum matrix plate is such as to maintain a repellent charge over its area except at the photoconductive holes which are illuminated. An illuminated hole conducts an attractive charge potential through the matrix plate and thus attracts charged vapor droplets to its location.

Referring now to FIG. 5, wherein like elements are given the same numerals as set forth with respect to the FIGS. 1–3 apparatus, the photoconductive matrix 28 is fabricated from an aluminum base 28A by forming holes 28B over its area to produce an aluminum honeycomb. A layer of aluminum oxide 51, indicated by cross hatching, is formed on the entire surface of the aluminum plate, including the holes 28B, by an anodizing process. A photoconductive coating 34 is deposited by vacuum evaporation techniques to cover the entire surface area, over the aluminum oxide 51 which is an insulator. After masking holes 28B on the top surface by filling them with particles, a metallic ohmic connection layer 36 is also deposited by vacuum evaporation or other suitable techniques, to make an ohmic contact with the upper surface of the photoconductive coating 34. Conductive layer 36 covers the top of holes 28B but is sufficiently thin to be transparent, thus allowing light to pass therethrough. The masking particles are removed from holes 28B and a protective dielectric layer 33, which has a photoconductive coating 34' on its upper surface, is cemented to the bottom of the matrix 28, so that the holes 28B are closed at the bottom by the photoconductive coating 34'. Transparent particles 35 are used to fill the holes 28B and are retained by a protective transparent layer 29 cemented to the top of matrix 28. The transparent particles 35 act to scatter light entering holes 28B in a vertical direction so that the light illuminates the photoconductive coating 34 on the sides of the illuminated holes 28B and lowers the resistance of the coating. Thus, when light enters a hole, the charging potential of the connection layer 36 will be conveyed to the bottom 47 of that hole. If light does not enter a hole, the charging potential at the bottom of that hole will be very small due to the very high resistance of the photoconductive layer 34 on the sides of that hole. Therefore, a pattern of charges on the bottom of matrix 28 can be generated, which will be the image of the light pattern falling on the top surface of the matrix 28.

In the electrical control arrangement of the FIG. 5 embodiment, an accelerating grid 50 has been added to provide control of vapor droplets 45 and to enable the reduction of the potential of the field grid 16. No switching of potentials is necessary in this embodiment because the aluminum matrix 28 is at a higher potential than the potential of the field grid 16 which results in a repellent charge effect which was obtained in the FIG. 1 apparatus by switching potential polarities. In the FIG. 5 embodiment, the potential may be varied by movement along the resistor 41' supplied by a power source as previously described.

It has thus been shown that the present invention provides an electrostatically controlled method and apparatus for vapor plating utilizing an electroless plating solution to deposit a printed circuit on an insulating substrate without the use of masking processes.

While specific embodiments have been illustrated and described, modifications will become apparent to those skilled in the art, and it is intended to cover in the appended claims all such modifications as come within the true spirit and scope of the invention.

What I claim is:

1. An electrostatically controlled method for vapor plating by utilizing an electroless plating solution to deposit a printed circuit or the like on an insulating substrate without the use of masking, comprising the steps of:

(a) applying electrical power to a vapor plating apparatus including a photoconductive matrix and a grid member positioned below said matrix, said matrix comprising a generally planar sheet of material having a metallic layer with a plurality of apertures formed through said sheet and said layer and a photoconductive coating on said layer and on the inside surfaces of said apertures;
    said matrix metallic layer being positively charged and said grid being negatively charged;

(b) inserting the substrate to be plated between said matrix and said grid member;

(c) positioning a film negative containing an image of the desired circuit or the like to be printed on the substrate above said matrix;

(d) illuminating said film negative thereby allowing light to strike certain of the apertures of the matrix thereby causing the resistance of said photoconductive coating to be lowered and thereby providing an improved conductive path from the positively charged matrix metallic layer to the bottom of the matrix apertures wherein these positive charges will accumulate on the lower surface of the substrate and provide a replica of the desired image pattern of said negative to be printed with the positive charges denoting the areas of the substrate to be printed;

(e) applying vibrational energy to a supply of electroless plating solution;

(f) directing the energy toward the surface of said solution to thereby cause very small droplets of solution to be impelled upwards toward said substrate which acquire negative charges from the grid member wherein the electrostatic field gradient between the grid member and the positive charges on the lower surface of the substrate accelerates these negatively charged droplets toward the positively charged areas where the droplets are deposited and merged together by their surface tension on the substrate thus defining and producing the desired pattern on the substrate;

(g) removing the vibrational energy and the electrical power when the desired thickness of the deposited pattern has been reached; and (h) removing the substrate.

2. The method defined in claim 1, additionally including the step of removing the film negative and inserting another film negative having a different pattern thereon prior to removing the vibrational energy and the electrical power so as to modify the pattern being deposited on the substrate such that certain portions of the deposited material may be deposited thicker than other portions.

3. The method defined in claim 2, additionally including the steps of:

(a) first applying electrical power to the vapor plating apparatus such that the said matrix metallic layer is connected to a negative polarity and said grid member is connected to a positive polarity;

(b) inserting a transparent film member above said matrix;

(c) illuminating said film member which allows light to shine through the film member and the matrix which causes the resistance of said photoconductive coating within the apertures of the matrix to be lowered thus providing an improved conductive path through the matrix and thereby cause the lower surface of said substrate to acquire negative charges;

(d) extinguishing the illumination of the film member and matrix;

(e) cutting off power to the matrix and grid member; and (f) removing said transparent film member prior to the previously described step of inserting said film negative containing images and application of electrical power such that the matrix has a positive polarity and the grid a negative polarity.

References Cited

UNITED STATES PATENTS

| | | | |
|---|---|---|---|
| 2,758,524 | 8/1956 | Sugarman | 96—1.3 |
| 2,808,328 | 10/1957 | Jacob | 96—1.5 |
| 3,010,883 | 11/1961 | Johnson et al. | 204—18 |
| 3,212,890 | 10/1965 | Kimble et al. | 96—1 |
| 3,242,858 | 3/1966 | Eastman et al. | 96—1.5 |
| 3,372,029 | 3/1968 | Nail | 96—1.8 X |
| 3,425,829 | 2/1969 | Cassiers et al. | 96—1 |

GEORGE F. LESMES, Primary Examiner

C. E. VAN HORN, Assistant Examiner